United States Patent [19]

Laursen

[11] Patent Number: 6,096,276
[45] Date of Patent: Aug. 1, 2000

[54] APPARATUS FOR EFFECTING SEQUENTIAL CHEMICAL SYNTHESES

[75] Inventor: Richard A. Laursen, Newton, Mass.

[73] Assignee: Trustees of Boston University, Boston, Mass.

[21] Appl. No.: 07/744,751

[22] Filed: Aug. 14, 1991

[51] Int. Cl.[7] .................................................. B01L 11/00
[52] U.S. Cl. ............................ 422/103; 422/99; 422/64; 422/65; 436/43
[58] Field of Search .............................. 422/99, 103, 116, 422/64, 65; 436/89, 43, 178

[56] References Cited

U.S. PATENT DOCUMENTS

| | | | |
|---|---|---|---|
| 4,221,568 | 9/1980 | Boettger | 422/64 X |
| 4,311,667 | 1/1982 | Gocho | 422/65 X |
| 4,728,502 | 3/1988 | Hamill | 422/116 |

*Primary Examiner*—James C. Housel
*Assistant Examiner*—Maureen M. Wallenhorst
*Attorney, Agent, or Firm*—Paul J. Cook

[57] ABSTRACT

Apparatus for effecting sequential chemical synthesis of a plurality of products on solid supports. A reactor is provided having a movable rotor section including a plurality of reactor modules each containing a solid support. A top stationary stator is provided having a plurality of reactor inlets and a bottom stator is provided having a plurality of reactor outlets. The rotor is rotatably mounted between the top and bottom stators and its position is controlled to effect reactant flow to one or a plurality of desired reactor modules. Alternatively, the movable rotor section can be replaced with a linear array of reactor modules that can move linearly relative to a linear stationary stator section.

4 Claims, 6 Drawing Sheets

Fig. 3e

| Col. | Peptide |
|---|---|
| 1 | EDCBA |
| 2 | EDCBA |
| 3 | XEDCBA |
| 4 | XDCBA |
| 5 | EXCBA |
| 6 | EDXBA |
| 7 | EDCXA |

Fig. 3f

| Col. | Peptide |
|---|---|
| 1 | FEDCBA |
| 2 | FEDCBA |
| 3 | XEDCBA |
| 4 | FXDCBA |
| 5 | FEXCBA |
| 6 | FEDXBA |
| 7 | FEDCXA |

Fig. 3g

| Col. | Peptide |
|---|---|
| 1 | FEDCBA |
| 2 | XFEDCBA |
| 3 | XEDCBA |
| 4 | FXDCBA |
| 5 | FEXCBA |
| 6 | FEDXBA |
| 7 | FEDCXA |

Fig. 3h

| Col. | Peptide |
|---|---|
| 1 | GFEDCBA |
| 2 | XFEDCBA |
| 3 | GXEDCBA |
| 4 | GFXDCBA |
| 5 | GFEXCBA |
| 6 | GFEDXBA |
| 7 | GFEDCXA |

APPARATUS FOR EFFECTING SEQUENTIAL CHEMICAL SYNTHESES

BACKGROUND OF THE INVENTION

This invention relates to an apparatus and process for effecting a plurality of sequential chemical syntheses in a plurality of reaction modules each containing a solid support.

Instrumentation for the automatic synthesis of peptides has been available since 1964, when Merrifield described the first automated solid-phase peptide synthesizer. Since that time Merrifield-type peptide synthesizers employing Merrifield chemistry (Boc-protected amino acids, polystyrene based synthesis resins, deprotection with trifluoroacetic acid, cleavage of peptide from resin with hydrogen fluoride) have come into wide use. More recently, the so-called Fmoc method of synthesis, Atherton et al. (1979) Bioorg. Chem 8, 351, (Fmoc-protected amino acids, protective acrylamide-silica gel based synthesis supports, deprotection with alkaline reagents, cleavage of peptides from supports with trifluoroacetic acid) have become popular. One characteristic that distinguishes the Merrifield and the Fmoc syntheses is that the former requires that reactions be carried out in a shaken reaction cell, whereas in the latter case the support can be packed into a column and reagents pumped through. The flow-through synthesis capabilities of the Fmoc method give it several advantages, which is one reason it has become increasingly popular in recent years.

Also in recent years there has been an increase in demand for small peptides of similar structure. One type of need is for epitope mapping of proteins, i.e., a search for the small regions (6–12 amino acids) of proteins that are antigenic sites for binding of antibodies; or immunogenic sites, which stimulate the immune response. Immunogenic peptides have the potential for use in making vaccines. One way to search for these sites in a protein containing, for example, 200 amino acids, is to synthesize a set of approximately 200 overlapping hexapeptides, each differing from its neighbor by a single amino acid. Other applications are the synthesis of analogs of a biologically active peptide, either to find a more active peptide, or to determine which amino acids are responsible for activity, by systematic variation of the sequence. Synthesis of such large numbers of peptides one by one, such as those set forth below, even using a machine, is very time consuming.

ABCDEFGHIJKLMNOP ABCDEFG ABCDEFG

ABCDE XBCDEFG AXCDEFG

BCDEF AXCDEFG AYCDEFG

CDEFG ABXDEFG AWCDEFG

DEFGH ABCXEFG AZCDEFG

EFGHI ABCDXFG AQCDEFG

There have been several methods and devices described to speed up this process. One of the first is the "teabag" method of Houghton (1985), Proc. Natl. Sci. USA 82, pg. 531 where synthesis is carried out on resins in small porous bags, which are soaked in solutions of the appropriate activated amino acid. Several bags can be placed in a single reaction vessel, and by proper "mixing and matching", several similar peptides can be synthesized (on a 50–100 umole scale) simultaneously. This process has not been automated, however. Another method is the "dipstick method" of Geysen et al., (1985) Proc. Natl. Acad. Sci. USA 82, 178–182 wherein very small quantities (1 umole) of peptide are synthesized on small polypropylene rods by dipping the rods into the appropriate solutions. The quantities that can be made are very small, and the process is not automated. Other multiple peptide synthesis systems are DuPont's RaMPS system, which is manual, and the method of Schnorrenberg et al. (1989), Tetrahedron 45, pgs 7759–7764. The latter device uses a robot arm to deliver reagents to synthesis support resins in wells of a micro-titre plate, and is purported to be capable of synthesizing 96 peptides at once.

It has also been proposed in U.S. Pat. No. 4,728,502 to provide an apparatus for effecting a series of sequential chemical reactions to form similar long chain molecules such as nucleic acids or peptides. The apparatus comprises a set of stacked plates, rotatable with respect to one another. Ports and reaction vessels containing a solid support are provided in each plate, so that reactant flow can be controlled through the plates to the desired reactor vessels. This process is undesirable since the flow of reactants is limited to only a small number of reaction vessels at a given set of plate positions and because reactant leakage can occur between the plates.

Accordingly, it would be desirable to provide a method and apparatus for simultaneously synthesizing in an automated fashion, in varying amounts, a plurality of similar chemical products such as peptides which are synthesized by sequentially adding molecules such as an amino acid to a chain of such molecules to form peptides.

SUMMARY OF THE INVENTION

In accordance with this invention, an apparatus is provided comprising a rotor module containing a plurality of reaction vessels each containing a solid reaction support composition. The rotor module is positioned between two stators. Liquid inlets and outlets are provided in each of the stators and in the rotor module so that a reagent can be directed to one or, in series to a plurality of reaction vessels. For example, when forming peptides from amino acids, the reagents introduced into the reaction vessel would comprise, in series, a protected amino acid, which binds to the solid support, a wash reagent to remove excess amino acid, a deprotecting reagent to deprotect the bound amino acid, a wash reagent to remove excess deprotecting agent, a second protected amino acid to react with the bound deprotected amino acid and a capping reagent. The rotor is rotatable relative to the stators so that the position of the liquid inlets and outlets on the stators and rotors are defined to direct given reagent to the desired reaction vessels. A bypass loop can be provided to direct a reagent to one or more reaction vessels while avoiding other reaction vessels within a series of reaction vessels. Alternatively, the rotor can be replaced with a linear array of reactor modules that can move linearly relative to a linear stationary stator section.

DESCRIPTION OF SPECIFIC EMBODIMENTS

The apparatus of this invention includes a movable section which can be a linear array or a rotor having a plurality of reaction vessels which are in serial fluid communication with each other. The rotor is positioned between two stators which are provided with conduits for fluids connected to provide the reaction vessels with reagent fluids by flow in series through one or more of the reaction vessels. For convenience, this invention will be described herein with reference to a rotor as the movable section. The rotor is rotated to align the rotor fluid inlets and the fluid rotor outlets with the stator fluid inlets and the stator fluid outlets so that a given reagent will flow in series to the desired number of reaction vessels on the rotor. The stators are in direct contact with the rotor so that the rotor can be rotated within the stators while effecting fluid sealing between inlets on the rotor and outlets on the rotor. Conduits are provided to direct fluid into a first stator, through a first reaction vessel on the rotor, through the second stator and then to a second inlet on the first stator. The second inlet directs fluid through a second reaction vessel on the rotor. This arrangement is repeated through additional reaction vessels on the rotor. The reaction vessels can be replaced with inert cartridges when it is desired to reduce the number of reaction vessels. In one embodiment, a bypass loop is provided so that, through appropriate valves, a reagent can be directed to one or more reaction vessels and then removed from the serial flow route prior to entering an undesired reaction vessel.

Figure 1:
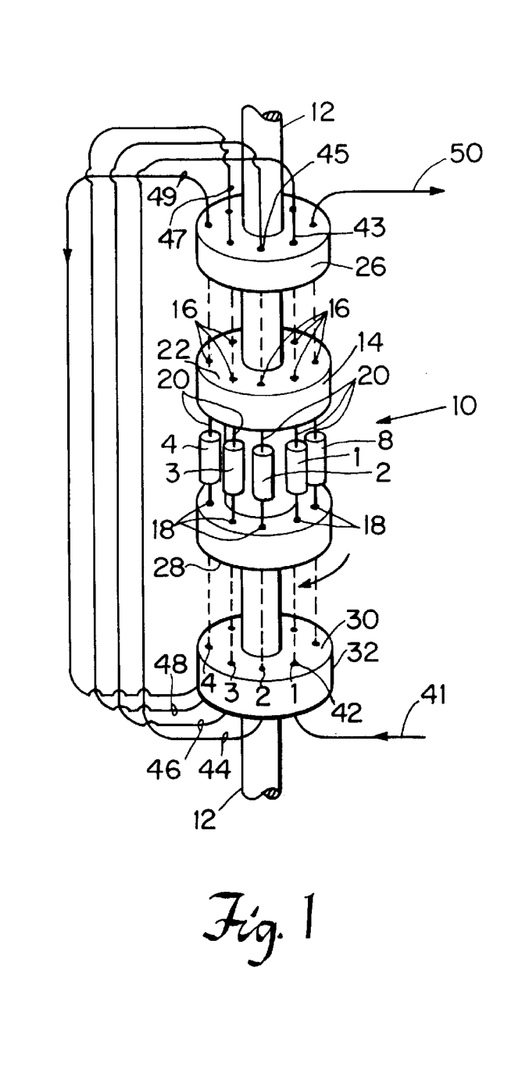
FIG. 1 is an isometric exploded view of the apparatus of this invention.

Referring to FIG. 1, the apparatus of this invention includes a rotatable rotor assembly 10 mounted on a rotatable axle 12 which, in turn, is connected to a motor (not shown). The rotor assembly 10 includes a plate 14 having a plurality of fluid outlets 16. A plurality of reactor vessels 1, 2, 3, 4 and 8 (shown) and 5, 6 and 7 (not shown, see FIGS. 2 and 3) are mounted on rotor assembly 10 and are connected to fluid inlet conduits 18 and fluid outlet conduits 20. The surface 22 of plate 14 contacts stator 26 and surface 28 of rotor 10 contacts surface 30 of stator 32. Rotor 10 is rotatable relative to stator 26 and stator 32. Inlet conduit 41 connects to stator inlet 42, a reactor vessel 1, a stator outlet 16 and outlet conduit 43. Conduit 43 connects to stator inlet 44, reactor vessel 2, a stator outlet 16 and outlet conduit 45. Conduit 45 connects to stator inlet 46, reactor 3, a stator outlet 16 and outlet conduit 47. Conduit 47 connects to stator inlet 48, reactor vessel 4, a stator outlet 16, and outlet conduit 49. The last reactor vessel is vessel 8 and reagent is sent to waste through conduit 50. Rotor 10 is rotatable so that any reaction vessel 1, 2, 3, 4, 5, 6, 7 or 8 can be aligned with first inlet 41 so that a given vessel such as vessel 1 is excluded from contact with a reagent as when conduit 41 is aligned with reactor vessel 2. Likewise when conduit 41 is aligned with reactor vessel 3, reactor vessels 1 and 2 are excluded from contact with the reagent.

Figure 2A:
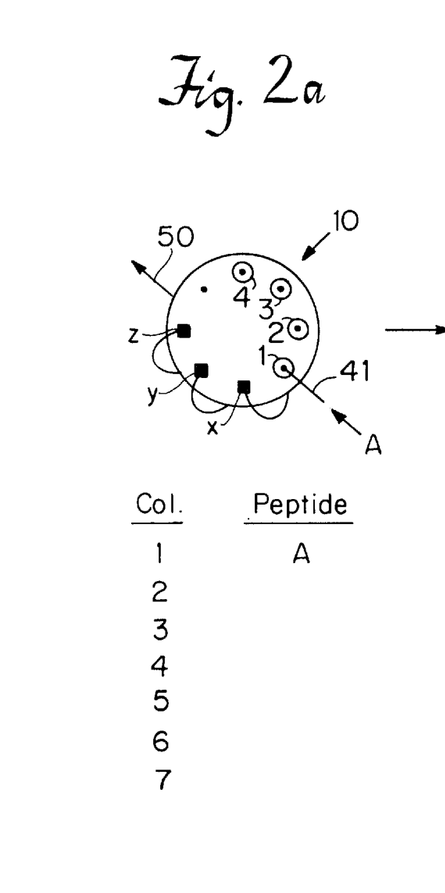
FIGS. 2a–2h illustrate the function of the apparatus of this invention.
Figure 2B:
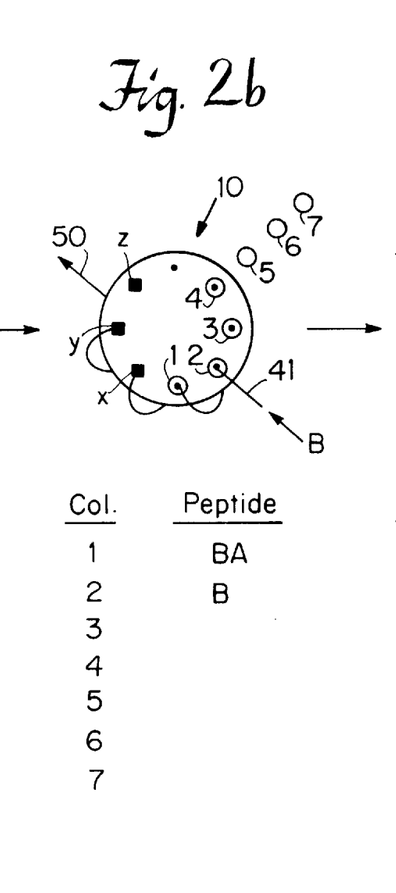
Figure 2C:
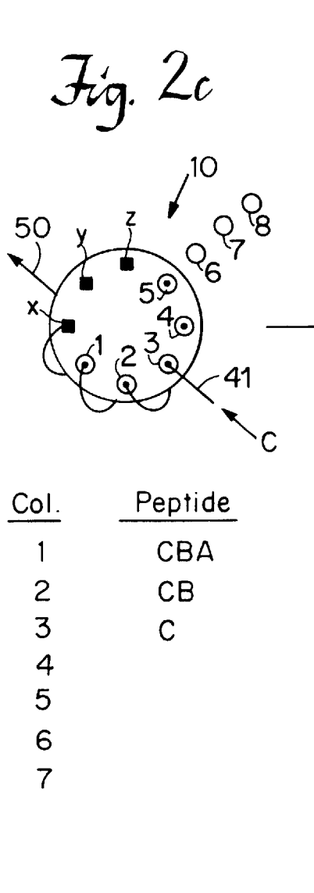
Figure 2D:
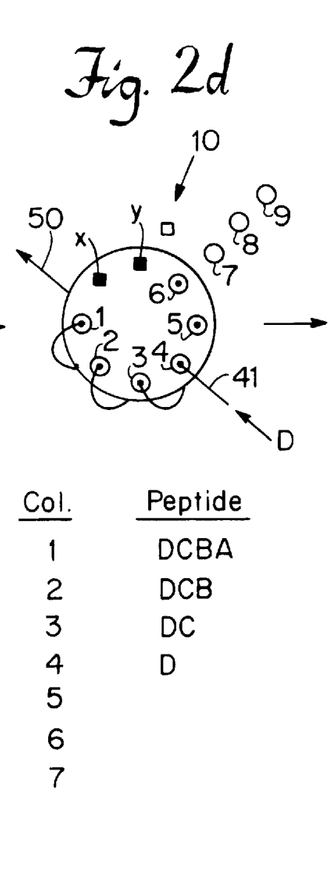
Figure 2E:
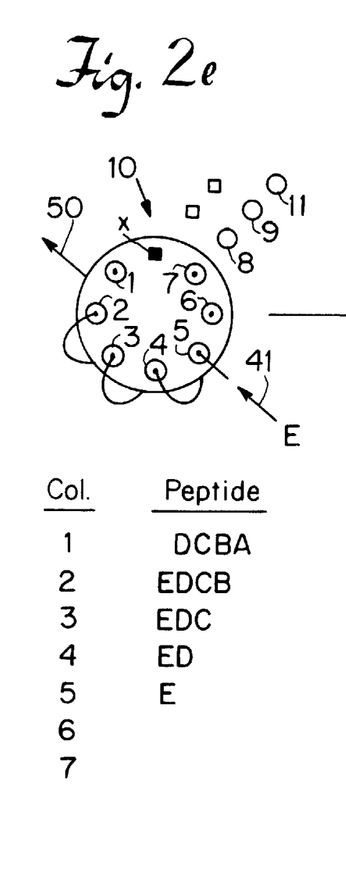
Figure 2F:
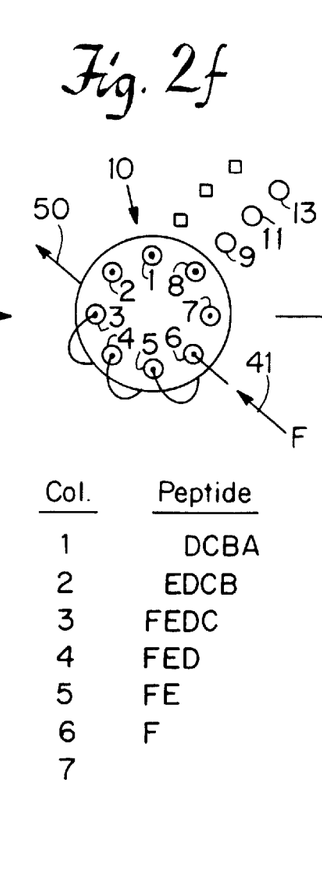
Figure 2G:
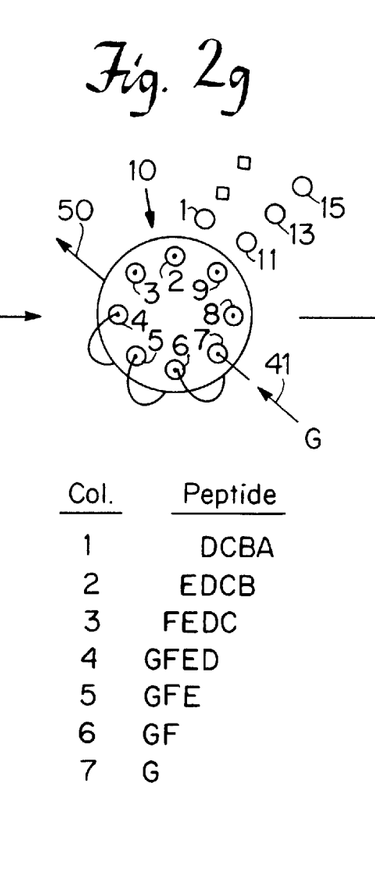
Figure 2H:
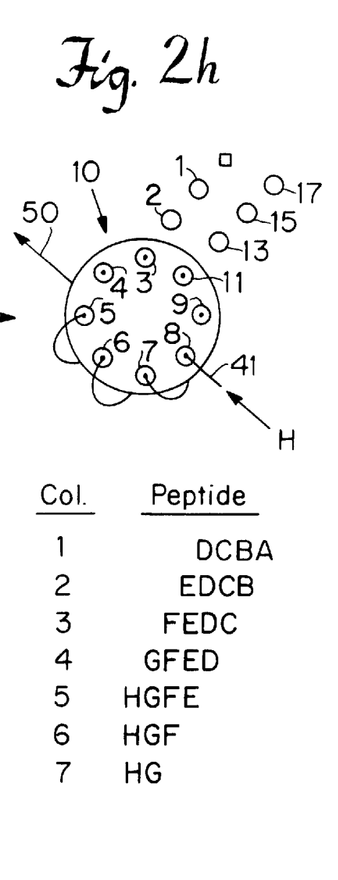

The operation of the apparatus of this invention without a bypass loop means is described with reference to FIGS. 2a through 2h. The small circles represent reaction vessels and the small squares represent blank cartridges. The amino acid reactants are represented by letters A through H. FIGS. 2a to 2h illustrate the formation of overlapping peptides from amino acids by any conventional method. FIGS. 2a through 2h will be described without reference to the usual deprotecting, washing and capping steps and with reference only to the step of reacting an amino acid to the substrate peptide bound to a conventional solid support. As shown in FIG. 2a, amino acid A is introduced through conduit 41 into reaction vessel 1 as well as blank cartridges x, y and z. Amino acid A is then removed from the rotor module 10 through conduit 50. As shown in FIG. 2b, rotor module 10 is rotated to connect inlet conduit 41 to reaction vessel 2. Amino acid B is introduced into reactor vessels 2 and 1 and two blank cartridges x and y. The peptide chain in each reaction vessel are shown in the tables below the comparable FIGS. 2a–2h. As shown in FIG. 2c, amino acid C is introduced first into reactor vessel 3 and then reactor vessels 2 and 1 and a blank cartridge x while reactor vessel 5 is introduced onto module 10. As shown in FIG. 2d rotor module 10 is positioned to align reactor vessel 4 and inlet conduit 41. Amino acid D is introduced into reactor vessels 4, 3, 2 and 1 while reactor vessel 6 replaces a blank cartridge on module 10. As shown in FIG. 2e, reactor vessel 5 is aligned with inlet conduit 41. Amino acid E is introduced into reactor vessels 5, 4, 3 and 2 and removed through outlet conduit 50. Reactor vessel 7 replaces a blank cartridge on module 10. As shown in FIG. 2f inlet conduit 41 is aligned with reactor vessel 6. Amino acid F is introduced into reactor vessels 6, 5, 4 and 3. Reactor vessel 8 replaced a blank cartridge on module 10. As shown in FIG. 2g inlet conduit 41 is aligned with reactor vessel 7. Reactor vessel 9 replaces reactor vessel 1 on module 10. As shown in FIG. 2h, inlet conduit 41 is aligned with reactor vessel 8. Amino acid H is introduced into reactor vessels 8, 7, 6 and 5. Reactor vessel 11 replaces reactor vessel 2 on module 10. Reactor vessels 13, 15 and 17 replace reactor vessels 3, 4 and 5 in subsequent steps.

Figure 3A:
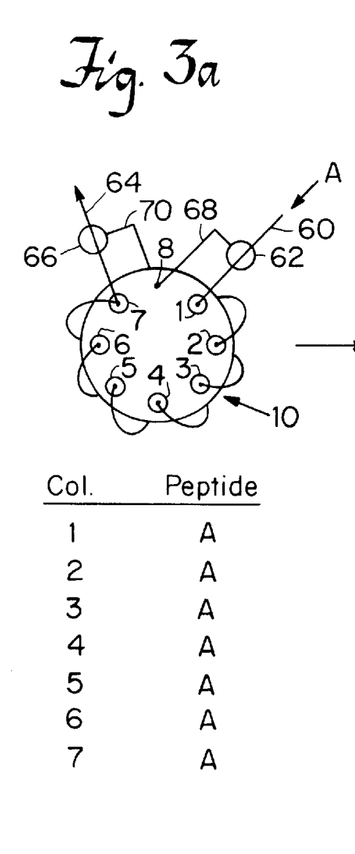
FIGS. 3a–3h illustrate the function of the apparatus of this invention utilizing a bypass loop.
Figure 3B:
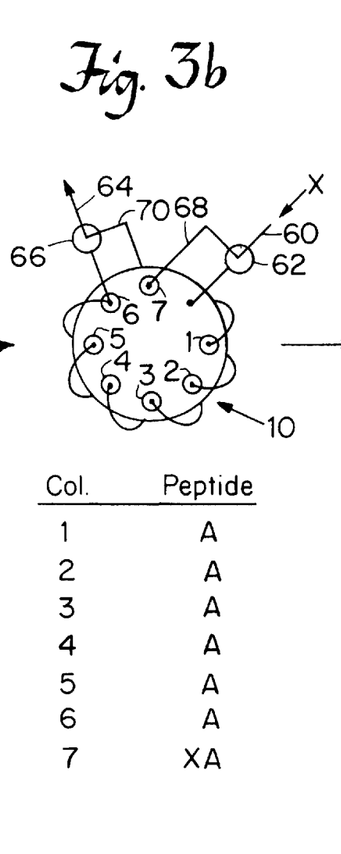
Figure 3C:
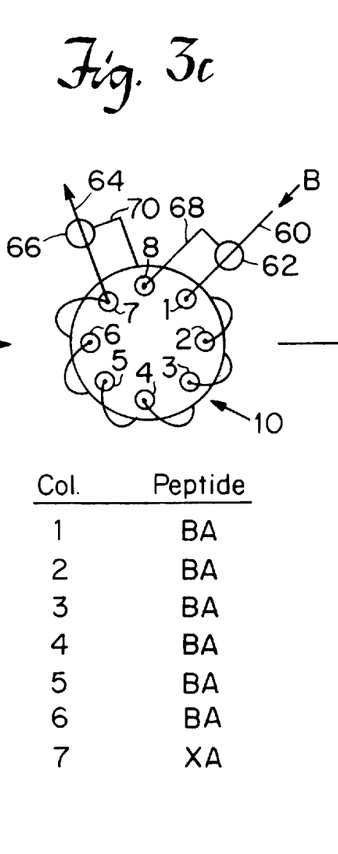
Figure 3D:
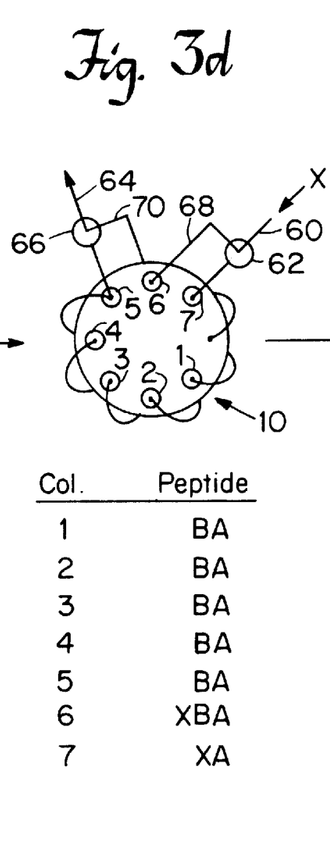
Figure 3E:
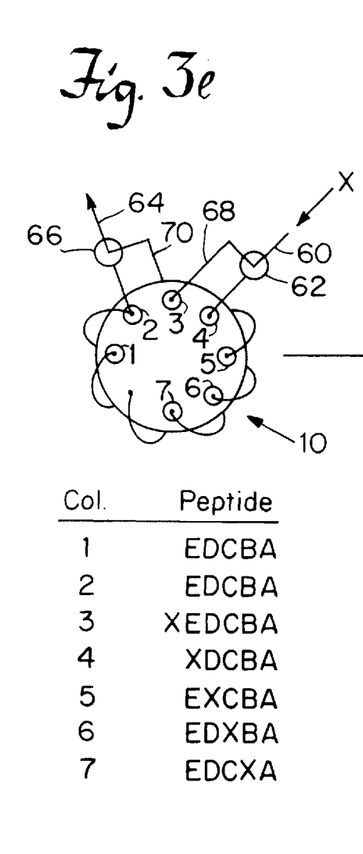
Figure 3F:
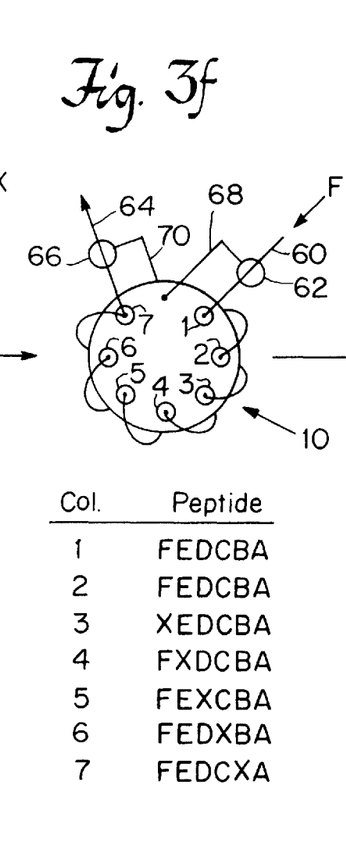
Figure 3G:
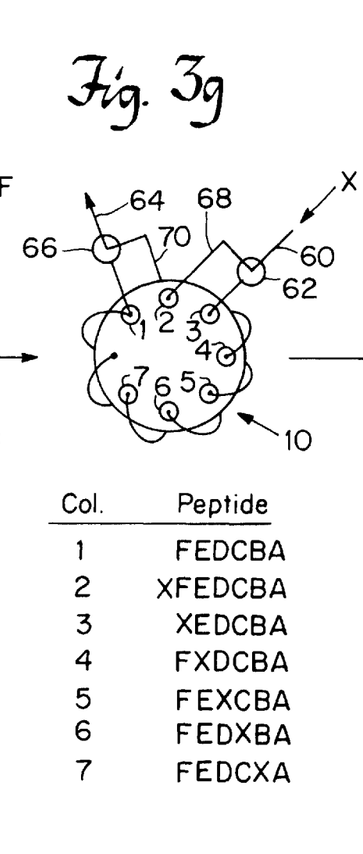
Figure 3H:
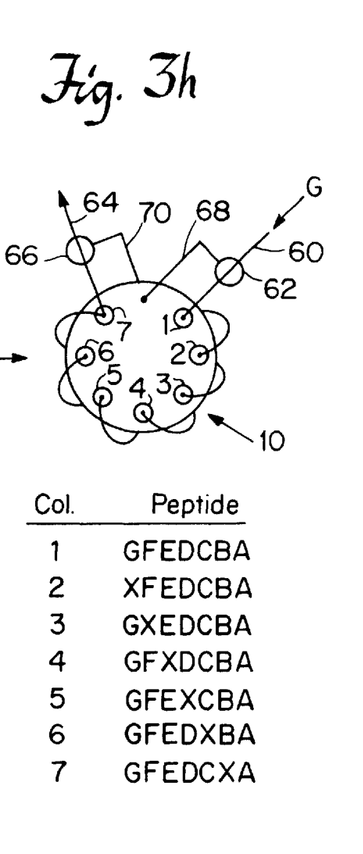

FIGS. 3a through 3h illustrates a series of steps for synthesis of peptides in which each amino acid in a peptide chain is systematically changed to an X, for example in order to provide a means for determining the immunogenic effect of each amino acid within a given peptide chain. As shown in FIG. 3, amino acid A is introduced through inlet conduit 60 and valve 62, through reactor vessels 1, 2, 3, 4, 5, 6 and 7 and through outlet conduit 64 and valve 66. As shown in FIG. 3b, amino acid X is introduced into reactor vessel 7 through conduit 60, valve 62 and conduit 68 and removed through conduit 70, valve 66 and conduit 64. In the same manner, module 10 is rotated so that amino acid X is introduced into the other reactor vessels as shown in FIGS. 3d, 3e and 3g. Other amino acids, B, F and G are introduced into reactor vessels as shown in FIGS. 3c, 3f and 3h. The peptide chains within each reactor vessels are shown in the tables below FIGS. 3a through 3h.

Figure 4:
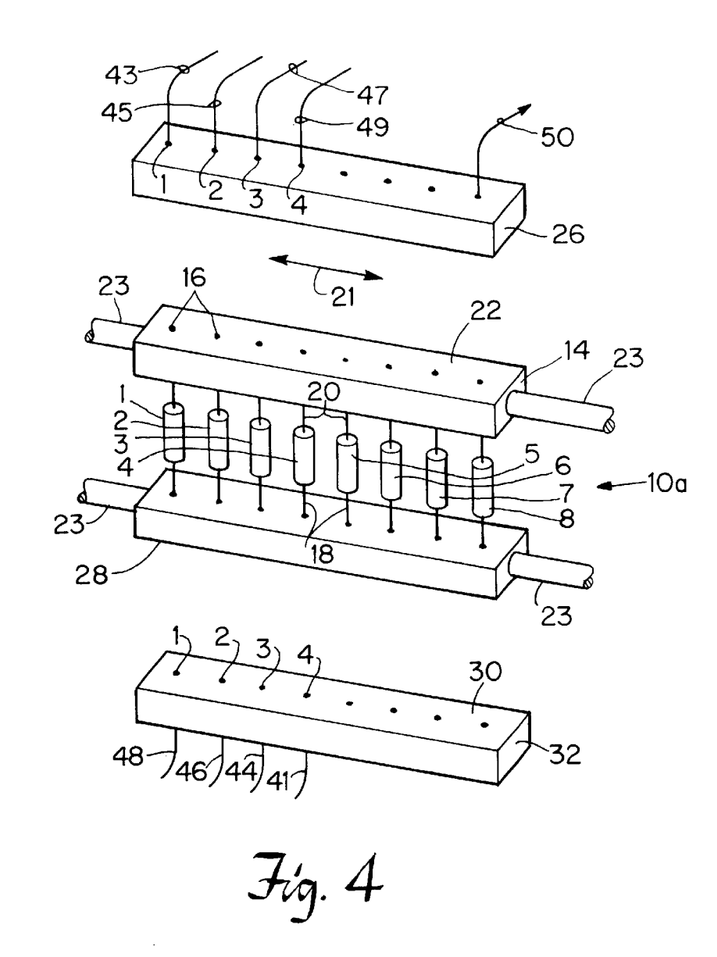
FIG. 4 is an isometric exploded view of an alternative apparatus of this invention.

Referring to FIG. 4, the linear embodiment of the present invention is shown. The elements in FIGS. 1 and 4 having the same reference numbers refer to the same elements. The only difference between the apparatus of FIG. 1 and FIG. 4 is that the movable section 10a moves linearly in two directions as illustrated by arrow 21 to position the reactor vessels 1 through 8 relative to the inlet and outlet conduits in the manner set forth above. Any conventional means can be used to move linear assembly 10a such as a motor means (not shown) attached to rods 23. A suitable positioning sequence of the reactors relative to the inlet and outlet conduits is described above.

Figure 5:
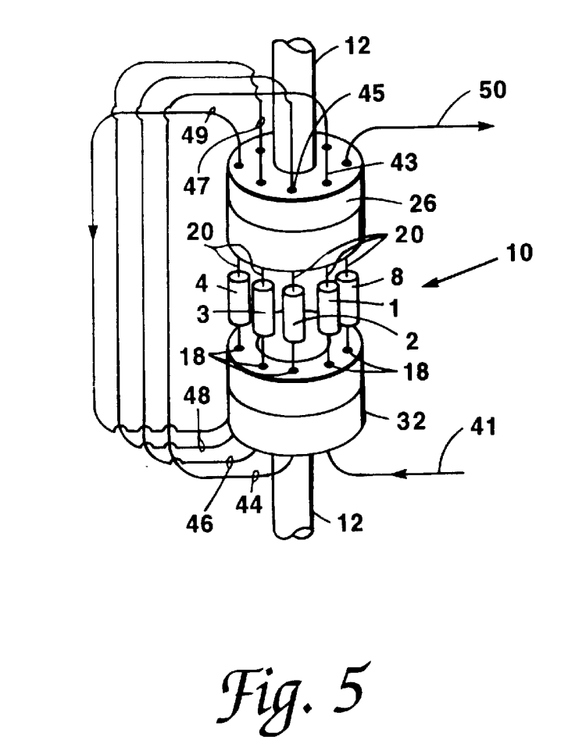
FIG. 5 is an isometric view of the apparatus of FIG. 1 in a closed position.

Referring to FIG. 5, the apparatus of this invention includes a rotatable rotor assembly 10 mounted on a rotatable axle 12 which, in turn, is connected to a motor (not shown). The rotor assembly 10 includes a plate 14 having a plurality of fluid outlets 16. A plurality of reactor vessels 1, 2, 3, 4 and 8 (shown) and 5, 6 and 7 (not shown, see FIGS. 2 and 3) are mounted on rotor assembly 10 and are connected to fluid inlet conduits 18 and fluid outlet conduits 20. Rotor 10 contacts stator 26 and rotor 10 contacts stator 32. Rotor 10 is rotatable relative to stator 26 and stator 32. Inlet conduit 41 connects to stator outlet 42, a reactor vessel 1, a stator outlet 16 and outlet conduit 42. Conduit 43 connects to stator inlet 44, reactor vessel 2, a stator outlet 16 and outlet conduit 45. conduit 45 connects to stator ilet 46, reactor 3, a stator outlet 16 and outlet conduit 47. Conduit 47 connects to stator inlet 48, reactor vessel 4, a stator outlet 16, and outlet conduit 49. The last reactor vessel is vesssel 8 and reagent is sent to waste through conduit 50. Rotor 10 is rotatable so that any reaction vessel 1, 2, 3, 4, 5, 6, 7 or 8 can be aligned with first inlet 41 so that a given vessel 1 is excluded from contact with a reagent as when conduit 41 is aligned with reactor vessel 2. Likewise when conduit 41 is aligned with reactor vessel 3, reactor vessels 1 and 2 are excluded from contact with the regeant.

Figure 6:
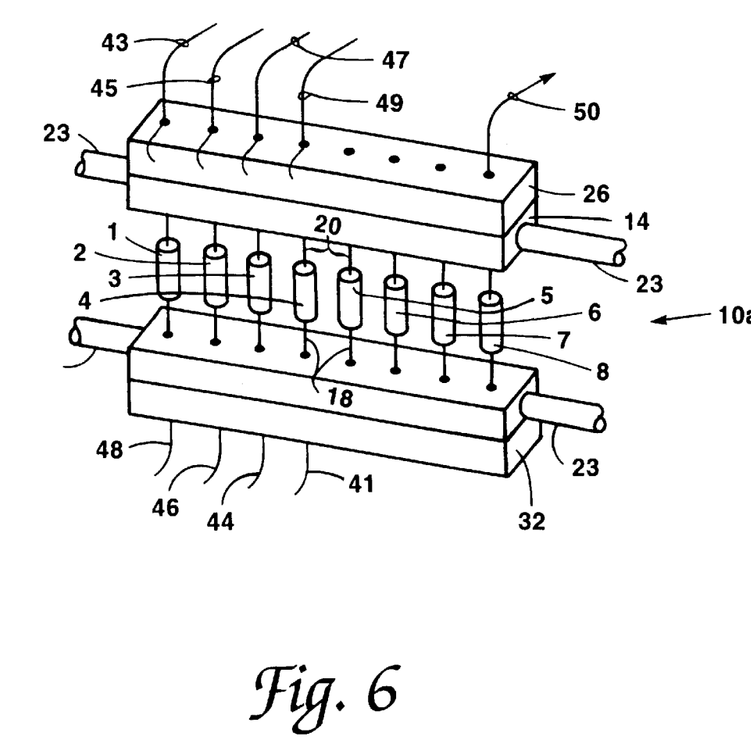

Referring to FIG. 6, the linear embodiment of the present invention is shown. The elements in FIGS. 5 and 6 having the same reference numbers refer to the same elements. The only difference between the apparatus of FIG. 5 and FIG. 6 is that the movable section 10a moves linearly in two directions to position the reactor vessels 1 through 8 relative to the inlet and outlet conduits in the manner set forth avove. Any conventional means can be used to move linear assembly 10a such as a motor means (not shown) attached to rods 23. A suitable positioning sequence of the reactors relative to the inlet and outlet conduits is described above.

What is claimed is:

1. Apparatus for effecting a plurality of independent chemical synthesis which comprises:

a rotor module including a plurality of reaction vessels, each of said reaction vessels containing a solid reaction support, said rotor module being positioned between and in leak proof contact with a first stator and a second stator, each of said vessels connected to a rotor fluid inlet and a rotor fluid outlet, said first stator having a plurality of first stator inlets, each in fluid communication with a first stator outlet, said first stator being in contact with a first surface of said rotor module, said second stator having a plurality of second stator inlets, each in fluid communication with a second stator outlet, said second stator being in contact with a second surface of said rotor module, each of said rotor fluid inlets being in fluid communication with one of said second stator outlets, each of said rotor fluid outlets being in fluid communication with one of said first stator inlets, means to rotate said rotor module relative to said stators to effect fluid communication of a rotor fluid inlet with a plurality of said second stator outlets, one at a time and to effect fluid communication of a rotor fluid outlet with a plurality of first stator inlets, one at a time, and conduit means connected to said first stator, said second stator, said rotor and said reaction vessels for passing a fluid reagent through a plurality of said reaction vessels in series.

2. Apparatus for effecting a plurality of independent chemical synthesis which comprises:

a rotor module including a plurality of reaction vessels, each of said reaction vessels containing a solid reaction support, said rotor being positioned between and in leak proof contact with a first stator and a second stator, each of said vessels connected to a rotor fluid inlet and a rotor fluid outlet, said first stator having a plurality of first stator inlets, each in fluid communication with a first stator outlet, said first stator being in contact with a first surface of said rotor module, said second stator having a plurality of second stator inlets, each in fluid communication with a second stator outlet, said second stator being in contact with a second surface of said rotor module, each of said rotor fluid inlets being in fluid communication with one of said second stator outlets, each of said rotor fluid outlets being in fluid communication with one of said first stator inlets, means to rotate said rotor module relative to said stators to effect fluid communication of a rotor fluid inlet with a plurality of said second stator outlets, one at a time and to effect fluid communication of a rotor fluid outlet with a plurality of first stator inlets, one at a time, and conduit means connected to said first stator, said second stator, said rotor and said reaction vessels for passing a fluid reagent through a plurality of said reaction vessels in series, and valving means in fluid communication with a rotor fluid inlet to one of said reaction vessels and in fluid communication with a rotor fluid outlet of said one of said reaction vessels to direct said fluid reagent through only said one of said reaction vessels.

3. Apparatus for effecting a plurality of independent chemical syntheses which comprises:

a linear movable module including a plurality of reaction vessels, each of said reaction vessels containing a solid reaction support, said linear movable module being positioned between and in leak proof contact with a first stator and a second stator, each of said vessels connected to a module fluid inlet and a module fluid outlet, said first stator having a plurality of first stator inlets, each in fluid communication with a first stator outlet, said first stator being in contact with a first surface of said movable module, said second stator having a plurality of second stator inlets, each in fluid communication with a second stator outlet, said second stator being in contact with a second surface of said movable module, each of said module fluid inlets being in fluid communication with one of said second stator outlets, each of said module fluid outlets being in fluid communication with one of said first stator inlets, means to move said module relative to said stators to effect fluid communication of a module fluid inlet with a plurality of said second stator outlets, one at a time and to effect fluid communication of a module fluid outlet with a plurality of first stator inlets, one at a time, and conduit means connected to said first stator, said second stator, said linear movable module and reaction vessels for passing a fluid reagent through a plurality of said reaction vessels in series.

4. Apparatus for effecting a plurality of independent chemical synthesis which comprises:

a linear movable module including a plurality of reaction vessels, each of said reaction vessels containing a solid reaction support, said linear movable module being positioned between and in leak proof contact with a first stator and a second stator, each of said vessels connected to a module fluid inlet and a module fluid outlet, said first stator having a plurality of first stator inlets, each in fluid communication with a first stator outlet, said second stator having a plurality of second stator inlets, each in fluid communication with a second stator outlet, each of said module fluid inlets being in fluid communication with one of said second stator outlets, each of said module fluid outlets being in fluid communication with one of first stator inlets, means to linearly move said movable module relative to said stators to effect fluid communication of a module fluid inlet with a plurality of said second stator outlets, one at a time and to effect fluid communication of a module fluid outlet with a plurality of first stator inlets, one at a time, and conduit means connected to said first stator, said second stator, said linear movable module and said reaction vessels for passing a fluid reagent through a plurality of said reaction vessels in series, and valving means in fluid communication with a rotor fluid inlet to one of said reaction vessels and in fluid communication with a rotor fluid outlet of said one of said reaction vessels to direct said fluid reagent through only said one of said reaction vessels.

* * * * *